United States Patent
Sämisch et al.

(10) Patent No.: US 9,617,457 B2
(45) Date of Patent: Apr. 11, 2017

(54) THERMALLY CONDUCTIVE THERMOPLASTIC COMPOSITIONS FEATURING BALANCED PROCESSABILITY

(71) Applicant: Covestro Deutschland AG, Leverkusen (DE)

(72) Inventors: Birte Sämisch, Köln (DE); Timo Kuhlmann, Leichlingen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/125,626

(22) PCT Filed: Mar. 11, 2015

(86) PCT No.: PCT/EP2015/055002
§ 371 (c)(1),
(2) Date: Sep. 13, 2016

(87) PCT Pub. No.: WO2015/135958
PCT Pub. Date: Sep. 17, 2015

(65) Prior Publication Data
US 2017/0002247 A1 Jan. 5, 2017

(30) Foreign Application Priority Data
Mar. 14, 2014 (EP) .................................. 14159892

(51) Int. Cl.
*C09K 5/14* (2006.01)
*C08L 69/00* (2006.01)

(52) U.S. Cl.
CPC .............. *C09K 5/14* (2013.01); *C08L 69/00* (2013.01); *C08L 2207/04* (2013.01)

(58) Field of Classification Search
CPC ........ C09K 5/14; C08L 69/00; C08L 2207/04
See application file for complete search history.

(56) References Cited

U.S. PATENT DOCUMENTS

| | | |
|---|---|---|
| 1,137,373 A | 4/1915 | Aylsworth |
| 1,191,383 A | 7/1916 | Aylsworth |
| 2,991,273 A | 7/1961 | Hechelhammer et al. |
| 2,999,835 A | 9/1961 | Goldberg |
| 2,999,846 A | 9/1961 | Schnell et al. |
| 3,148,172 A | 9/1964 | Fox |
| 3,271,367 A | 9/1966 | Schnell et al. |
| 3,404,061 A | 10/1968 | Shane et al. |
| 3,879,348 A | 4/1975 | Serini et al. |

(Continued)

FOREIGN PATENT DOCUMENTS

| | | |
|---|---|---|
| DE | 1 570 703 A1 | 2/1970 |
| DE | 2 036 052 A1 | 1/1972 |

(Continued)

OTHER PUBLICATIONS

International Search Report for PCT/EP2015/055002 mailed May 22, 2015.

*Primary Examiner* — Michael C Miggins
(74) *Attorney, Agent, or Firm* — Drinker Biddle & Reath LLP

(57) ABSTRACT

The invention relates to thermally conductive thermoplastic compositions with balanced processing capacity, i.e. with a balanced proportion of melt volume flow rate to heat distortion resistance, comprising a thermoplastic, an expanded graphite, at least one phosphorus compound, and also ethylene/alkyl (meth)acrylate copolymer.

13 Claims, 1 Drawing Sheet

(56) References Cited

U.S. PATENT DOCUMENTS

| | | |
|---|---|---|
| 4,982,014 A | 1/1991 | Freitag et al. |
| 5,097,002 A | 3/1992 | Sakashita et al. |
| 5,340,905 A | 8/1994 | Kühling et al. |
| 5,672,645 A | 9/1997 | Eckel et al. |
| 5,717,057 A | 2/1998 | Sakashita et al. |
| 6,596,840 B1 | 7/2003 | Kratschmer et al. |
| 6,740,730 B1 | 5/2004 | Kratschmer et al. |
| 7,071,284 B2 | 7/2006 | Kauth et al. |
| 7,074,351 B2 | 7/2006 | Döbler et al. |
| 7,169,834 B2 | 1/2007 | Döbler et al. |
| 8,357,741 B2 | 1/2013 | Meyer et al. |
| 8,845,920 B2 | 9/2014 | Meyer |
| 9,034,949 B2 | 5/2015 | Müller et al. |
| 2010/0283001 A1 | 11/2010 | Pot et al. |
| 2011/0118371 A1 | 5/2011 | Staal et al. |
| 2011/0281051 A1 | 11/2011 | Dufaure et al. |
| 2011/0293921 A1 | 12/2011 | Meyer et al. |
| 2012/0319031 A1 | 12/2012 | Li et al. |

FOREIGN PATENT DOCUMENTS

| | | |
|---|---|---|
| DE | 2 063 050 A1 | 7/1972 |
| DE | 2 211 956 A1 | 10/1973 |
| DE | 3 832 396 A1 | 2/1990 |
| DE | 10006208 A1 | 8/2001 |
| DE | 10022037 A1 | 11/2001 |
| EP | 0 363 608 A1 | 4/1990 |
| EP | 0 640 655 A2 | 3/1995 |
| EP | 1 559 743 A1 | 8/2005 |
| EP | 1 865 027 A1 | 12/2007 |
| FR | 1 561 518 A | 3/1969 |
| GB | 1122003 A | 7/1968 |
| GB | 1229482 A | 4/1971 |
| GB | 1367790 A | 9/1974 |
| IT | RM20100225 A1 | 11/2011 |
| IT | RM20100227 A1 | 11/2011 |
| IT | RM20100228 A1 | 11/2011 |
| JP | H02127040 A | 5/1990 |
| JP | 2007031611 A | 2/2007 |
| JP | 2011178889 A | 9/2011 |
| WO | WO-0105866 A1 | 1/2001 |
| WO | WO-0105867 A1 | 1/2001 |
| WO | WO-2004063249 A1 | 7/2004 |
| WO | WO-2009043850 A2 | 4/2009 |
| WO | WO-2010003891 A1 | 1/2010 |
| WO | WO-2010061129 A1 | 6/2010 |
| WO | WO-2012049264 A2 | 4/2012 |

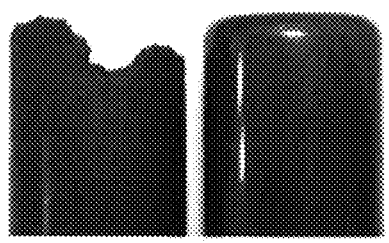

THERMALLY CONDUCTIVE THERMOPLASTIC COMPOSITIONS FEATURING BALANCED PROCESSABILITY

CROSS-REFERENCE TO RELATED APPLICATIONS

This application is a national stage application (under 35 U.S.C. §371) of PCT/EP2015/055002, filed Mar. 11, 2015, which claims benefit of European Application No. 14159892.0, filed Mar. 14, 2014, both of which are incorporated herein by reference in their entirety.

BACKGROUND OF THE INVENTION

Subject of the invention are thermally conductive thermoplastic compositions having balanced processing properties, comprising a thermoplastic, a particulate, thermally conductive filler, at least one phosphorus compound, and also ethylene/alkyl (meth)acrylate copolymer.

The use of thermally conductive fillers for producing thermally conductive thermoplastic compositions is known. In order to give the thermoplastic composition a thermal conductivity sufficient for numerous applications, the thermoplastics are admixed with large amounts of thermally conductive fillers, which in some cases are platelet-shaped. This results in reduced processing properties of the modified particle composition, this being manifested in a significant reduction in the melt volume flow rate (MVR) of the thermoplastic compositions and hence in no longer complete filling of the respective cavities of moulds, even with short flow pathways. Moreover, the modulus of elasticity of highly filled thermoplastic compositions is too high—that is, they exhibit high resistance under elastic deformation acting from outside.

Thus US 2012/0319031 A1 describes compositions containing 30% to 90% of an amorphous thermoplastic or of at least one semi-crystalline thermoplastic, or a mixture of the two, and 10% to 70% of an expanded graphite, with about 90% of the particles of the expanded graphite having a particle size of at least 200 µm. Disadvantages of these compositions are the inadequate flow capacity and also the high modulus of elasticity, allowing the compositions described to be used only in selected applications.

WO 2009/043850 A2 describes heat-processable, thermally conductive polymer compositions containing 30 wt % to 95 wt % of a thermoplastic polymer and also 5 wt % to 40 wt % of a graphite powder in the form of platelets having a thickness of less than 500 nm, where the graphite powder preferably has a specific BET surface area of at least 10 m²/g as determined by the method of ASTM D3037, and a particle size distribution, determined by laser diffraction, that is characterized by a D(v, 0.9) of at least 50 µm. The compositions described in that document achieve low thermal conductivity and can be processed only to a limited degree in case of prolonged flow pathways. Moreover, the particle size distribution of the preferred graphite powders is too low for any significant improvement in thermal conductivity to be achieved.

WO 2010/061129 A1 describes thermoplastic polymer compositions comprising special expanded graphites having a BET surface area of 15 m²/g to 30 m²/g, with a bulk density of less than 0.1 g/cm³ and also with an average particle size expressed by a D(v, 0.5) of greater than 15 µm. On account of the fine graphite particles of low bulk density, the compositions modified therewith are not sufficiently processable in relatively long cavities. According to the values stated in this document, the thermal conductivity achieved using these compositions is, for many applications, too low.

JP 2007-031611 A describes thermoplastic compositions containing 20 to 99 parts by weight of a thermoplastic polymer and also 1 to 80 parts by weight of a graphite distinguished by a bulk density s 0.15 g/cm³. The graphite is further characterized by the pH of a specific suspension of graphite in water. The document provides no information about the processing properties or the heat distortion resistance of the resultant compositions. In relatively long cavities it is not possible to process the compositions claimed, which contain more than 45% of graphite.

JP 2011-178889 A describes compositions for LED lighting holders, the compositions comprising 40 to 95 parts by weight of a thermoplastic polymer and 5 to 60 parts by weight of a thermally expanded graphite, with 2 to 25 parts by weight of a phosphorus-based flame retardant additive and 0.01 to 1 part by weight of a fluorine-containing anti-dripping agent, based on the total amount of polycarbonate and expanded graphite. Specimens produced from the composition and having a thickness of 1.8 mm receive a UL 94 assessment of V0 and at the same time have a thermal conductivity of 4 W/(m*K). Use of the fluorine-containing anti-dripping agent in the compositions described results in a distinct reduction in the heat distortion resistance. Compositions with more than 15 parts by weight of the phosphorus-based flame retardant additive likewise exhibit a marked reduction in heat distortion resistance, and the melt volume flow rate (MVR) also falls in such a way that processing by injection moulding is hindered.

Consequently, there are no known compositions of high thermal conductivity in the prior art that exhibit a balanced proportion of melt volume flow rate (MVR) and heat distortion resistance and which can therefore be processed flawlessly to component parts in relatively long cavities. There is also a lack of materials which exhibit low longitudinal shrinkage and which exhibit sufficient resistance to elastic deformations applied from outside, without exhibiting excessive rigidity.

BRIEF SUMMARY OF THE INVENTION

It is an object of the present invention, therefore, to provide thermally conductive thermoplastic compositions which are distinguished by a balanced proportion of melt volume flow rate to heat distortion resistance, thereby producing thermoplastic compositions whose processing properties are a significant improvement on the prior art, and to provide thermoplastic compositions which are notable for low longitudinal shrinkage in conjunction with a balanced modulus of elasticity.

Surprisingly it has now been found that this object is achieved by means of compositions comprising A) 20.0 to 80.49 wt % of polycarbonate, B) 15.0 to 60.0 wt % of expanded graphite, the D(0.5) of the graphite, determined by sieve analysis according to DIN 51938, being <1.2 mm, C) 4.5 to 10 wt % of at least one phosphorus compound of the general formula (V)

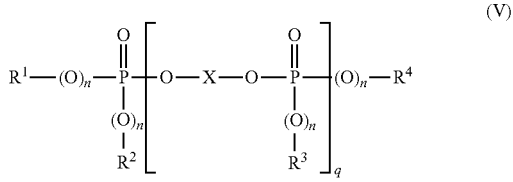

in which

R$^1$, R$^2$, R$^3$ and R$^4$ independently of one another are C$_1$- to C$_8$-alkyl, in each case optionally halogenated and in each case branched or unbranched, and/or C$_5$- to C$_6$-cycloalkyl, C$_6$- to C$_{20}$-aryl or C$_7$- to C$_{12}$-aralkyl, in each case optionally substituted by a branched or unbranched alkyl, preferably C$_1$- to C$_4$-alkyl, and/or halogen, preferably chlorine and/or bromine, n independently at each occurrence is 0 or 1, q is an integer from 0 to 30, X is a monocyclic or polycyclic aromatic radical having 6 to 30 C atoms or is a linear or branched aliphatic radical having 2 to 30 C atoms, it being possible for the radical in each case to be substituted or unsubstituted, bridged or unbridged;

D) 0.01 to 5.0 wt % of at least one ethylene/alkyl (meth) acrylate copolymer which preferably has a melt flow index of at least 2.5 g/10 min, determined according to ASTM D 1238 (at 190° C. and 2.16 kg), E) optionally at least one further polymer additive, selected from the group of the heat stabilizers, flame retardants other than component C, antistatic agents, colorants, pigments, mould release agents, UV absorbers, IR absorbers and/or fillers, selected from the group of chalk, quartz powder, titanium dioxide, silicates, aluminosilicates, aluminium oxide, silica, magnesium hydroxide and/or aluminium hydroxide, with components A) to E) adding up to 100 wt %.

The thermoplastic compositions of the invention have a minimum thermal conductivity (in plane) of preferably ≥9 W/(m*K), a heat distortion resistance of ≥100° C. and a melt volume flow rate at 330° C. under a load of 2.16 kg of ≥10 cm$^3$/10 min. Particularly preferred thermoplastic compositions of the invention have a heat distortion resistance≥110°.

Thermoplastic compositions of the invention are notable, moreover, for longitudinal shrinkage of ≤0.14% and also for a modulus of elasticity of ≤6500 N/mm$^2$, thus giving the thermoplastic compositions excellent resistance to elastic deformation supplied from outside, without exhibiting excessive rigidity.

DETAILED DESCRIPTION OF THE INVENTION

Component A

Polycarbonates are used as component A.

"Polycarbonate" refers in accordance with the invention both to homopolycarbonates and to copolycarbonates and polyestercarbonates.

The thermoplastic polycarbonates, including the thermoplastic aromatic polyestercarbonates, have average molecular weights M$_w$ (determined by measuring the relative viscosity at 25° C. in CH$_2$Cl$_2$ with a concentration of 0.5 g per 100 ml of CH$_2$Cl$_2$) of 20 000 g/mol to 32 000 g/mol, preferably of 23 000 g/mol to 31 000 g/mol, more particularly of 24 000 g/mol to 31 000 g/mol.

A portion, up to 80 mol %, preferably from 20 mol % up to 50 mol %, of the carbonate groups in the polycarbonates used in accordance with the invention may have been replaced by aromatic dicarboxylic ester groups. Polycarbonates of this kind, comprising not only carbonic acid radicals but also aromatic dicarboxylic acid radicals incorporated into the molecular chain, are termed aromatic polyestercarbonates. In the context of the present invention they are subsumed within the generic term of the thermoplastic aromatic polycarbonates.

The polycarbonates are produced in a known way from diphenols, carbonic acid derivatives, optionally chain terminators and optionally branching agents, with a portion of the carbonic acid derivatives being replaced by aromatic dicarboxylic acids or derivatives of the dicarboxylic acids for the purpose of preparing the polyestercarbonates, specifically according to the intended replacement of carbonate structural units in the aromatic polycarbonates with aromatic dicarboxylic ester structural units.

Dihydroxyaryl compounds suitable for the production of polycarbonates are those of the formula (2)

$$HO—Z—OH \quad (2),$$

in which

Z is an aromatic radical having 6 to 30 carbon atoms, it being possible for said radical to comprise one or more aromatic rings, to be substituted, and to contain aliphatic or cycloaliphatic radicals and/or alkylaryls or heteroatoms as bridging members.

Z in formula (2) is preferably a radical of the formula (3)

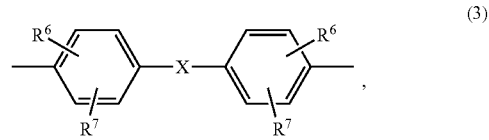

in which

R$^6$ and R$^7$ independently of one another are H, C$_1$- to C$_{18}$-alkyl, C$_1$- to C$_{18}$-alkoxy, halogen such as Cl or Br, or aryl or aralkyl each of which is optionally substituted, and preferably are H or C$_1$- to C$_{12}$-alkyl, more preferably H or C$_1$- to C$_8$-alkyl, and very preferably H or methyl, and X is a single bond, —SO$_2$—, —CO—, —O—, —S—, C$_1$- to C$_6$-alkylene, C$_2$- to C$_5$-alkylidene or C$_5$- to C$_6$-cycloalkylidene which may be substituted by C$_1$- to C$_6$-alkyl, preferably methyl or ethyl, or else is C$_6$- to C$_{12}$-arylene, which may optionally be fused with aromatic rings containing further heteroatoms.

X is preferably a single bond, C$_1$- to C$_5$-alkylene, C$_2$- to C$_5$-alkylidene, C$_5$- to C$_6$-cyclo-alkylidene, —O—, —SO—, —CO—, —S—, —SO$_2$— or a radical of the formula (3a) or (3b)

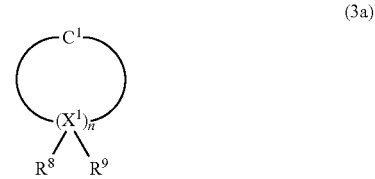

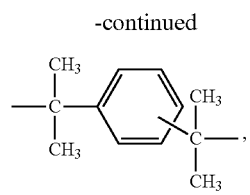
(3b)

where
R$^8$ and R$^9$ are selectable individually for each X$^1$ and independently of one another are hydrogen or C$_1$- to C$_6$-alkyl, preferably hydrogen, methyl or ethyl, and
X$^1$ is carbon and
n is an integer from 4 to 7, preferably 4 or 5,
with the proviso that on at least one atom X$^1$, R$^8$ and R$^9$ are simultaneously alkyl.

Examples of dihydroxyaryl compounds (diphenols) are as follows: dlhydroxybenzenes, dihydroxybiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulphides, bis(hydroxyphenyl) sulphones, bis(hydroxyphenyl) sulphoxides, 1,1'-bis(hydroxyphenyl)diisopropylbenzenes, and also their ring-alkylated and ring-halogenated compounds.

Examples of diphenols suitable for producing the polycarbonates for use in accordance with the invention include hydroquinone, resorcinol, dihydroxybiphenyl, bis(hydroxyphenyl)alkanes, bis(hydroxyphenyl)cycloalkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, α,α'-bis(hydroxyphenyl)diisopropylbenzenes, and also their alkylated, ring-alkylated and ring-halogenated compounds.

Preferred diphenols are 4,4'-dihydroxyblphenyl, 2,2-bis(4-hydroxyphenyl)-1-phenyl-propane, 1,1-bis(4-hydroxyphenyl)phenylethane, 2,2-bis(4-hydroxyphenyl)propane, 2,4-bis(4-hydroxyphenyl)-2-methylbutane, 1,3-bis(2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Particularly preferred diphenols are 4,4'-dihydroxybiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

These and further suitable diphenols are described for example in U.S. Pat. No. 2,999,835 A, U.S. Pat. No. 3,148,172 A, U.S. Pat. No. 2,991,273 A, U.S. Pat. No. 3,271,367 A, U.S. Pat. No. 4,982,014 A and U.S. Pat. No. 2,999,846 A, in German laid-open specifications 1 570 703 A, 2 063 050 A, 2 036 052 A, 2 211 956 A and 3 832 396 A, in French patent specification 1 561 518 A1, in the H. Schnell monograph "Chemistry and Physics of Polycarbonates", Interscience Publishers, New York 1964, p. 28 ff.; p. 102 ff.; and in D. G. Legrand, J. T. Bendler, "Handbook of Polycarbonate Science and Technology", Marcel Dekker New York 2000, p. 72 ff.

In the case of the homopolycarbonates, only one diphenol is used; in the case of copolycarbonates, two or more diphenois are used. The diphenols used, and also all other auxiliaries and chemicals added to the synthesis, may be contaminated with the impurities originating from their own synthesis, handling and storage. It is desirable, however, to work with extremely pure raw materials.

The monofunctional chain terminators needed in order to regulate the molecular weight, such as phenols or alkylphenols, especially phenol, p-tert-butylphenol, isooctylphenol, cumylphenol, the chlorocarbonic esters thereof or acyl chlorides of monocarboxylic acids, and/or mixtures of these chain terminators, are either supplied to the reaction with the bisphenolate or bisphenolates, or else added to the synthesis at any desired point in time, provided that there are still phosgene or chlorocarbonic acid end groups present in the reaction mixture, or, in the case of the acyl chlorides and chlorocarbonic esters as chain terminators, provided that there are sufficient phenolic end groups available in the polymer as it forms. Preferably, however, the chain terminator or terminators are added after the phosgenation, at a location or at a point in time when there is no longer any phosgene present but with the catalyst having not yet been added, or they are metered in before the catalyst, together with the catalyst or in parallel.

In a similar way, any branching agents or mixtures of branching agents to be used are added to the synthesis, but usually before the chain terminators. It is usual to use trisphenols, quaterphenols or acyl chlorides of tricarboxylic or tetracarboxylic acids, or else mixtures of the polyphenols or of the acyl chlorides.

Some of the compounds which can be used as branching agents and have three or more than three phenolic hydroxyl groups are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tris(4-hydroxyphenyl)benzene, 1,1,1-tri(4-hydroxyphenyl)ethane, tris(4-hydroxyphenyl)methane, 2,2-bis[4,4-bis(4-hydroxyphenyl)cyclohexyl]propane, 2,4-bis(4-hydroxyphenylisopropyl)phenol, tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The amount of any branching agents to be used is 0.05 mol % to 2 mol %, based in turn on moles of diphenols used in each case.

The branching agents may be introduced initially in the aqueous alkaline phase with the diphenols and with the chain terminators, or may be added in solution in an organic solvent prior to phosgenation.

All of these measures for the production of the polycarbonates are familiar to the skilled person.

Examples of aromatic dicarboxylic acids suitable for producing the polyestercarbonates include ortho-phthalic acid, terephthalic acid, isophthalic acid, tert-butylisophthalic acid, 3,3'-biphenyldicarboxylic acid, 4,4'-biphenyldicarboxylic acid, 4,4-benzophenonedicarboxylic acid, 3,4'-benzophenonedicarboxylic acid, 4,4'-dlphenyl ether dicarboxylic acid, 4,4'-diphenyl sulphone dicarboxylic acid, 2,2-bis(4-carboxyphenyl)propane and trimethyl-3-phenylindane-4,5'-dicarboxylic acid.

Used with particular preference among the aromatic dicarboxylic acids are terephthalic acid and/or isophthalic acid.

Derivatives of the dicarboxylic acids are the dicarboxylic dihalides and the dicarboxylic dialkyl esters, especially the dicarboxylic dichlorides and the dicarboxylic dimethyl esters.

The replacement of the carbonate groups with the aromatic dicarboxylic ester groups takes place substantially stoichiometrically and also quantitatively, and so the molar ratio of the reactants is also found in the completed polyestercarbonate. The incorporation of the aromatic dicarboxylic ester groups may occur either randomly or in blocks.

Preferred modes of producing the polycarbonates for use in accordance with the invention, including the polyestercarbonates, are the known interfacial process and the known melt transesterificaton process (cf. e.g. WO 2004/063249 A1, WO 2001/05866 A1, WO 2000/105867, U.S. Pat. No. 5,340,905 A, U.S. Pat. No. 5,097,002 A, U.S. Pat. No. 5,717,057 A).

In the first case, acid derivatives are preferably phosgene and optionally dicarboxylic dichlorides; in the latter case they are preferably diphenyl carbonate and optionally dicarboxylic diesters. Catalysts, solvents, work-up, reaction conditions, etc. for polycarbonate production and polyestercarbonate production have been widely described and are well known in both cases.

The polycarbonates, polyestercarbonates and polyesters can be worked up in a known way and processed to moldings of any desired kind, by means of extrusion or injection moulding, for example.

Component B

Expanded graphite is used as component B.

In the expanded graphites, the individual basal planes of the graphite have been driven apart by a specific treatment, resulting in an increase in volume of the graphite, preferably by a factor of 200 to 400. Specifications describing the production of expanded graphites include U.S. Pat. No. 1,137,373 A, U.S. Pat. No. 1,191,383 A and U.S. Pat. No. 3,404,061 A.

In the compositions, graphites are used in the form of fibres, rods, beads, hollow spheres, platelets, in powder form, in each case both in aggregated form and in agglomerated form, preferably in platelet form.

The platelet-shaped structure refers in the present invention to a particle which has a flat geometry. Accordingly, the height of the particles is usually much smaller by comparison with the width or length of the particles. Flat particles of these kinds may in turn have undergone aggregation or agglomeration to form structures.

The height of the platelet-shaped primary particles is less than 500 nm, preferably less than 200 nm and more preferably less than 100 nm. As a result of the small sizes of these primary particles, the shape of the particles may be bent, curved, corrugated or otherwise deformed.

The length dimensions of the particles may be determined by standard methods, such as by electron microscopy, for example.

In the thermoplastic compositions of the invention, graphite is used in amounts of 15.0 to 60.0 wt %, preferably 20.0 to 45.0 wt %, more preferably 20.0 to 35.0 wt %, very preferably 30.0 to 35 wt %, in order to obtain good thermal conductivity in the thermoplastic compositions and at the same time to ensure a high processing spectrum.

Preferred in accordance with the invention is a graphite having a relatively high specific surface area, determined as the BET surface area by means of nitrogen adsorption in accordance with ASTM D3037. Preferred for use in the thermoplastic compositions are graphites having a BET surface area of a $\geq 5$ m$^2$/g, more preferably a $\geq 10$ m$^2$/g and very preferably a $\geq 18$ m$^2$/g.

The D(0.5) of the graphite, determined by sieve analysis according to DIN 51938, is <1.2 mm.

The graphites preferably have a particle size distribution, characterized by the D(0.9), of at least 1 mm, preferably of at least 1.2 mm, more preferably of at least 1.4 mm and more preferably still of at least 1.5 mm.

Likewise preferably, the graphites have a particle size distribution, characterized by the D(0.5), of at least 400 µm, preferably of at least 600 µm, more preferably of at least 750 µm and more preferably still of at least 850 µm.

The graphites preferably have a particle size distribution, characterized by the D(0.1), of at least 100 µm, preferably of at least 150 µm, more preferably of at least 200 µm and more preferably still of at least 250 µm.

The characteristic numbers D(0.1), D(0.5) and D(0.9) are determined by sieve analysis in accordance with DIN 51938.

The graphites used have a density, determined using xylene, in the range from 2.0 g/cm$^3$ to 2.4 g/cm$^3$, preferably from 2.1 g/cm$^3$ to 2.3 g/cm$^3$, and more preferably from 2.2 g/cm$^3$ to 2.27 g/cm$^3$.

The carbon content of the graphites used in accordance with the invention, determined according to DIN 51903 at 800° C. for 20 hours, is preferably $\geq 90\%$, more preferably $\geq 95\%$ and more preferably still a $\geq 98\%$.

The residual moisture content of the graphites used in accordance with the invention, determined according to DIN 38414 at 110° C. for 8 hours, is preferably $\leq 5\%$, more preferably $\leq 3\%$ and more preferably still $\leq 2\%$.

The thermal conductivity of the graphites used according to the invention prior to processing, is between 250 and 400 W/(m*K) parallel to the basal planes and between 6 to 8 W/(m*K) perpendicular to the basal planes.

The electrical resistance of the graphites used in accordance with the invention prior to processing is about 0.001 Ω*cm parallel to the basal planes and less than 0.1 Ω*cm perpendicular to the basal planes.

The bulk density of the graphites, determined according to DIN 51705, is usually between 50 g/l and 250 g/l, preferably between 65 g/l and 220 g/l and more preferably between 100 g/l and 200 g/l.

Graphites used in the thermoplastic compositions preferably have a sulphur content of less than 200 ppm.

Preferably, moreover, graphites used in the thermoplastic compositions have a leachable chlorine on content of less than 100 ppm.

Likewise preferably, graphites used in the thermoplastic compositions have a nitrates and nitrites content of less than 50 ppm.

Particularly preferred for use are graphites which exhibit all of these limiting values, i.e. for the sulphur content, the chlorine ion content, the nitrate content and the nitrite content.

Graphites available commercially include Ecophit® GFG 5, Ecophit® GFG 50, Ecophit® GFG 200, Ecophit® GFG 350, Ecophit® GFG 500, Ecophit® GFG 900, Ecophit® GFG 1200 from SGL Carbon GmbH, TIMREX® BNB90, TIMREX® KS5-44, TIMREX® KS6, TIMREX® KS150, TIMREX® SFG44, TIMREX® SFG150, TIMREX C-THERM™ 001 and TIMREX® C-THERM™ 011 from TIMCAL Ltd., SC 20 O, SC 4000 O/SM and SC 8000 O/SM from Graphit Kropfmühl AG, Mechano-Cond 1, Mechano-Lube 2 and Mechano-Lube 4G from H.C. Carbon GmbH, Nord-Min 251 and Nord-Min 560T from Nordmann Rassmann GmbH, and ASBURY A99, Asbury 230U and Asbury 3806 from Asbury Carbons.

Component C

Components C in the sense according to the invention are selected from the group of the monomeric and oligomeric phosphoric and phosphonic esters; mixtures of two or more components selected from one or various of these groups may also be employed as component C.

Monomeric and oligomeric phosphoric and/or phosphonic esters used in accordance with the invention are phosphorus compounds of the general formula (V)

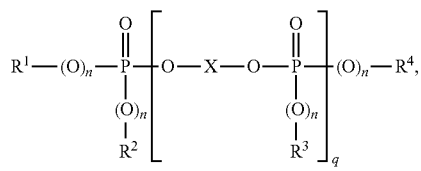
(V)

in which $R^1$, $R^2$, $R^3$ and $R^4$ independently of one another are $C_1$- to $C_8$-alkyl, in each case optionally halogenated and in each case branched or unbranched, and/or $C_5$- to $C_6$-cycloalkyl, $C_6$- to $C_{20}$-aryl or $C_7$ to $C_{12}$-aralkyl, in each case optionally substituted by a branched or unbranched alkyl, and/or halogen, preferably chlorine and/or bromine, n independently at each occurrence is 0 or 1, q is an integer from 0 to 30, and X is a monocyclic or polycyclic aromatic radical having 6 to 30 C atoms or is a linear or branched aliphatic radical having 2 to 30 C atoms, it being possible for the radical in each case to be substituted or unsubstituted, bridged or unbridged.

Preferably $R^1$, $R^2$, $R^3$ and $R^4$ independently of one another are branched or unbranched $C_1$- to $C_4$-alkyl, phenyl, naphthyl or $C_1$- to $C_4$-alkyl-substituted phenyl. In the case of aromatic groups $R^1$, $R^2$, $R^3$ and/or $R^4$, they may in turn be substituted by halogen groups and/or alkyl groups, preferably chlorine, bromine and/or $C_1$- to $C_4$-alkyl, branched or unbranched. Particularly preferred aryl radicals are cresyl, phenyl, xylenyl, propylphenyl or butylphenyl, and also the corresponding brominated and chlorinated derivatives thereof.

X in the formula (V) derives preferably from diphenols.

n in the formula (V) is preferably 1.

q is preferably 0 to 20, more preferably 0 to 10, and in the case of mixtures comprises average values from 0.8 to 5.0, preferably 1.0 to 3.0, more preferably 1.05 to 2.00 and very preferably from 1.08 to 1.60.

A preferred phosphorus compound of the general formula V is a compound of the formula I:

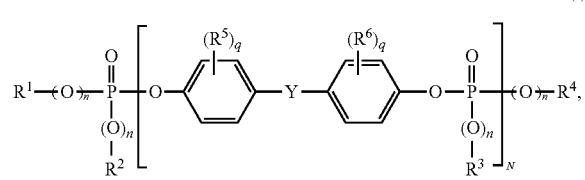
(I)

in which $R^1$, $R^2$, $R^3$ and $R^4$ in each case independently of one another are linear or branched $C_1$- to $C_8$-alkyl and/or $C_5$- to $C_6$-cycloalkyl, $C_6$- to $C_{10}$-aryl or $C_7$- to $C_{12}$-aralkyl each optionally substituted by linear or branched alkyl, n independently at each occurrence is 0 or 1, q independently at each occurrence is 0, 1, 2, 3 or 4, N is a number between 1 and 30, $R_5$ and $R_6$ independently of one another are linear or branched $C_1$- to $C_4$-alkyl, preferably methyl, and Y is linear or branched $C_1$- to $C_7$-alkylidene, linear or branched $C_1$- to $C_7$-alkylene, $C_5$- to $C_{12}$-cycloalkylene, $C_5$- to $C_{12}$-cycloalkylidene, —O—, —S—, —SO—, $SO_2$ or —CO—.

X in formula V is more preferably

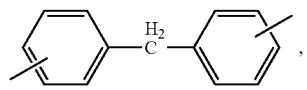

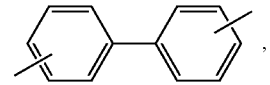

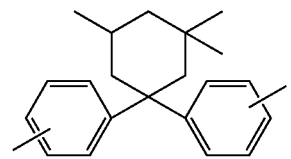

or their chlorinated and/or brominated derivatives. Preferably X (with the adjacent oxygen atoms) derives from hydroquinone, bisphenol A or diphenylphenol. Likewise preferably X derives from resorcinol. With particular preference X derives from bisphenol A.

Phosphorus compounds of the formula (V) are, in particular, tributyl phosphate, triphenyl phosphate, tricresyl phosphate, diphenyl cresyl phosphate, diphenyl octyl phosphate, diphenyl 2-ethylcresyl phosphate, tri(isopropylphenyl) phosphate, resorcinol-bridged oligophosphate and bisphenol A-bridged oligophosphate. The use of oligomeric phosphoric esters of the formula (V) which derive from bisphenol A is especially preferred.

Extremely preferred as component C is bisphenol A-based oligophosphate of formula (Va).

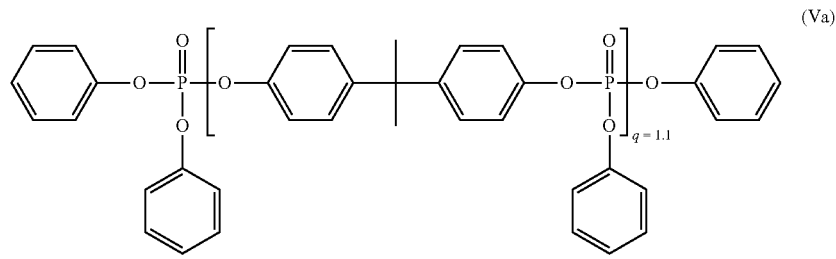
(Va)

Particularly preferred, moreover, are oligophosphates analogous to the formula (Va), in which q is between 1.0 and 1.2.

The phosphorus compounds of component C are known (cf. e.g. EP 0 363 608 A1, EP 0 640 655 A2) or can be prepared by known methods in an analogous way (e.g. Ullmanns Enzyklopädie der technischen Chemie, Vol. 18, p. 301 ff., 1979; Houben-Weyl, Methoden der organischen Chemie, Vol. 12/1, p. 43; Beilstein Vol. 6, p. 177).

Preference is given to using mixtures with the same structure and different chain lengths, with the reported value of q being the average value of q. The average value of q is determined by ascertaining the composition of the phosphorus compound mixture (molecular weight distribution) by means of high-pressure liquid chromatography (HPLC) at 40° C. in a mixture of acetonitrile and water (50:50) and using this to calculate the average values for q.

The compositions of the invention contain 4.5 to 10 wt %, preferably 6.0 to 10.0 wt %, more preferably 6.0 to 9.0 wt % of component C.

Alternatively particularly preferred compositions of the invention contain 5.0 to 7.0 wt % of component C.

Component D

Component D in the sense of the present invention is an ethylene/alkyl (meth)acrylate copolymer of the formula (VI),

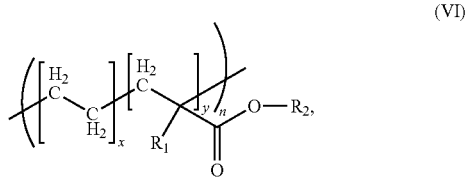
(VI)

where
$R_1$ is methyl or hydrogen,
$R_2$ is hydrogen or a $C_1$- to $C_{12}$-alkyl radical, preferably methyl, ethyl, propyl, isopropyl, butyl, sec-butyl, tert-butyl, isobutyl, hexyl, isoamyl or tert-amyl,
x and y are each an independent degree of polymerization (integer), and
n is an integer$\geq 1$.

The ratios of the degrees of polymerization x and y are preferably in the range of x:y=1:300 to 90:10.

The ethylene/alkyl (meth)acrylate copolymer may be a random, block or multi-block copolymer or may comprise mixtures of these structures. Used in one preferred embodiment are branched and unbranched ethylene/alkyl (meth) acrylate copolymers, more preferably linear ethylene/alkyl (meth)acrylate copolymers.

The melt flow index (MFR) of the ethylene/alkyl (meth) acrylate copolymer (measured at 190° C. under a load of 2.16 kg, ASTM D1238) is preferably in the range of 2.5-40.0 g/(10 min), more preferably in the range of 3.0-10.0 g/(10 min), very preferably in the range of 3.0-8.0 g/(10 min).

Used with preference in compositions of the invention is Elvaloy® 1820 AC (DuPont). This is an ethylene/methyl acrylate copolymer having a methyl acrylate content of 20% and a melt flow index of 8 g/(10 min), determined at 190° C. and 2.16 kg according to ASTM D1238.

The compositions of the invention contain 0.01 to 5 wt %, preferably 2 to 4.5 wt %, very preferably 3 to 4 wt % of component D.

Component E

The polycarbonate compositions may also be admixed with the additives customary for the stated thermoplastics, such as flame retardants other than component C, fillers, heat stabilizers, antistatic agents, colorants and pigments, mould release agents, UV absorbers and IR absorbers, in the customary amounts.

The compositions of the invention preferably contain no further flame retardants apart from component C. The compositions of the invention are preferably also free from fluorine-containing anti-dripping agents, such as from PTFE (polytetrafluoroethylene).

The amount of further additives is preferably up to 5 wt %, more preferably 0.01 to 3 wt %, based on the overall composition.

Suitable additives are described for example in "Additives for Plastics Handbook", John Murphy, Elsevier, Oxford 1999 and in "Plastics Additives Handbook", Hans Zweifel, Hanser, Munich 2001.

Examples of suitable antioxidants or heat stabilizers are alkylated monophenols, alkylthiomethylphenols, hydroquinones and alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, acylaminophenols, esters of β-(3,5-di-tert-butyl-4-hydroxyphenyl)propionic acid, esters of β-(5-tert-butyl-4-hydroxy-3-methylphenyl)proponic acid, esters of β-(3,5-dicyclohexyl-4-hydroxyphenyl)propionic acid, esters of 3,5-di-tert-butyl-4-hydroxyphenylacetic acid, amides of β-(3,5-di-tert-butyl-4-hydroxyphenyl)propionic acid, suitable thiosynergists, secondary antioxidants, phosphites and phosphonites, benzofuranones and indolinones.

Preference is given to organic phosphites such as triphenylphosphine, tritolylphosphine or 2,4,6-tri-tert-butylphenyl 2-butyl-2-ethylpropane-1,3-diyl phosphate, phosphonates and phosphanes, usually those in which the organic radicals consist entirely or partly of optionally substituted aromatic radicals.

Especially suitable additives are IRGANOX® 1076 (octadecyl 3,5-di-tert-butyl-4-hydroxyhydrocinnamate, CAS No. 2082-79-3) and also triphenylphosphine (TPP).

Examples of suitable mould release agents are the esters or partial esters of mono- to hexahydric alcohols, more particularly of glycerol, of pentaerythritol or of Guerbet alcohols.

Monohydric alcohols are, for example, stearyl alcohol, palmityl alcohol and Guerbet alcohols. A dihydric alcohol is, for example, glycol; a trihydric alcohol is, for example, glycerol; tetrahydric alcohols are, for example, pentaerythritol and mesoerythritol; pentahydric alcohols are, for example, arabitol, ribitol and xylitol; hexahydric alcohols are, for example, mannitol, glucitol (sorbitol) and dulcitol.

The esters are preferably the monoesters, diesters, triesters, tetraesters, pentaesters and hexaesters or mixtures thereof, more particularly statistical mixtures, of saturated, aliphatic $C_{10}$ to $C_{36}$ monocarboxylic acids and optionally hydroxymonocarboxylic acids, preferably with saturated aliphatic $C_{14}$ to $C_{32}$ monocarboxylic acids and optionally hydroxymonocarboxylic acids.

The fatty acid esters available commercially, especially those of pentaerythritol and of glycerol, may comprise <60% of various partial esters as a consequence of the preparation process.

Examples of saturated aliphatic monocarboxylic acids having 10 to 36 C atoms are capric acid, lauric acid, myristic acid, palmitic acid, stearic acid, hydroxystearic acid, arachidic acid, behenic acid, lignoceric acid, cerotinic acid and montanic acids.

Suitable IR absorbers are disclosed for example in EP 1 559 743 A1, EP 1 865 027 A1, DE 10022037 A1, DE 10006208 A1 and also in Italian patent applications RM2010A000225, RM2010A000227 and RM2010A000228. Of the IR absorbers stated in the cited literature, preference is given to those based on boride and on tungstate, especially caesium tungstate or zinc-doped caesium tungstate, and also to absorbers based on ITO and ATO, and also to combinations thereof.

Suitable UV absorbers from the class of the benzotriazoles are, for example, Tinuvin® 171 (2-[2-hydroxy-3-dodecyl-5-methylbenzyl)phenyl]-2H-benzotriazole (CAS No. 125304-04-3)), Tinuvin® 234 (2-[2-hydroxy-3,5-di(1,1-dimethylbenzyl)phenyl]-2H-benzotriazole (CAS No. 70321-86-7)), Tinuvin® 328 (2-[2-hydroxy-3,5-di-tert-amylphenyl]-2H-benzotriazole (CAS No. 25973-55-1)).

Suitable UV absorbers from the class of the oxalanilides are, for example, Sanduvor® 3206 (N-(2-ethoxyphenyl) ethanediamide (CAS No. 82493-14-9)) from Clariant or N-(2-ethoxyphenyl)-N'-(4-dodecylphenyl)oxamide (CAS No. 79102-63-9).

Suitable UV absorbers from the class of the hydroxybenzophenones are, for example, Chimasorb® 81 (2-benzoyl-5-octyloxyphenol (CAS No. 1843-05-6)) from BASF SE, 2,4-dihydroxybenzophenone (CAS No. 131-56-6), 2-hydroxy-4-(n-octyloxy)benzophenone (CAS No. 1843-05-6), 2-hydroxy-4-dodecyloxybenzophenone (CAS No. 2985-59-3).

Suitable UV absorbers from the class of the triazines are, for example, 2-[2-hydroxy-4-[3-(2-ethylhexyl-1-oxy)-2-hydroxypropyloxy]phenyl]-4,6-bis(2,4-dimethylphenyl)-1,3,5-triazine (CAS No. 137658-79-8), also known as Tinuvin® 405 (BASF SE), and 2,4-diphenyl-6-[2-hydroxy-4-(hexyloxy)phenyl]-1,3,5-triazine (CAS No. 147315-50-2), available as Tinuvin® 1577 (BASF SE).

The compound 2-[2-hydroxy-4-[(octyloxycarbonyl)ethylideneoxy]phenyl]-4,6-di(4-phenyl)phenyl-1,3,5-triazine has the CAS No. 204848-45-3 and is available from BASF SE under the name Tinuvin® 479.

The compound 2-[2-hydroxy-4-[(2-ethylhexyl)oxy]phenyl]-4,6-di(4-phenyl)phenyl-1,3,5-triazine has the CAS No. 204583-39-1 and is available from BASF SE under the name CGX-UVA006 or Tinuvin® 1600.

UV absorbers are used generally in an amount of 0.01 to 5 wt %, preferably 0.01 to 2 wt %, more preferably 0.01 to 0.05 wt %, based on the overall composition.

The polycarbonate composition may be admixed with organic and inorganic fillers in customary amounts. Contemplated in principle for this purpose are all finely ground organic and inorganic materials. These materials may for example be particulate, flakelike or fibriform in character. Mention may be made by way of example at this point of chalk, quartz powder, titanium dioxide, silicates/aluminosilicates such as, for example, talc, wollastonite, mica/clay layer minerals, montmorillonite, including in particular in an organophilic form modified by ion exchange, kaolin, zeolites, vermiculite and also aluminium oxide, silica, magnesium hydroxide and aluminium hydroxide. Mixtures of different inorganic materials may also be employed.

Preferred inorganic fillers are ultra-finely divided (nanoscale) inorganic compounds of one or more metals from main groups 1 to 5 and transition groups 1 to 8 of the periodic table, preferably from main groups 2 to 5, more preferably from main groups 3 to 5, and/or from transition groups 4 to 8, with the elements oxygen, sulphur, boron, phosphorus, carbon, nitrogen, hydrogen and/or silicon.

Examples of preferred compounds are oxides, hydroxides, hydrous/basic oxides, sulphates, sulphites, sulphides, carbonates, carbides, nitrates, nitrites, nitrides, borates, silicates, phosphates and hydrides.

Colorants or pigments which can be used are, for example, organic or inorganic pigments or organic dyes or the like.

Colorants or pigments in the sense of the present Invention are sulphur-containing pigments such as cadmium red or cadmium yellow, iron cyanide-based pigments such as Prussian blue, oxide pigments such as titanium dioxide, zinc oxide, red iron oxide, black iron oxide, chromium oxide, titanium yellow, zinc-iron-based brown, titanium-cobalt-based green, cobalt blue, copper-chromium-based black and copper-iron-based black or chromium-based pigments such as chromium yellow, phthalocyanine-derived dyes such as copper phthalocyanine blue or copper phthalocyanine green, condensed polycyclic dyes and pigments such as azo-based ones (e.g. nickel azo yellow), sulphur-indigo dyes, perinone-based, perylene-based, quinacridone-derived, dioxazine-based, soindolinone-based and quinophthalone-derived derivatives, anthraquinone-based heterocyclic systems.

Specific examples of commercial products are, for example, MACROLEX® Blue RR, MACROLEX® Violet 3R, MACROLEX® Violet B (Lanxess AG, Germany), Sumiplast® Violet RR, Sumiplast® Violet B, Sumiplast® Blue OR, (Sumitomo Chemical Co., Ltd.), Diaresin® Violet D, Diaresin® Blue G, Diaresin® Blue N (Mitsubishi Chemical Corporation), Heliogene Blue or Hellogen Green (BASF AG, Germany).

Preferred among these are cyanine derivatives, quinoline derivatives, anthraquinone derivatives and phthalocyanine derivatives.

One preferred composition of the invention comprises
A) 20.0 to 77.0 wt % of polycarbonate,
B) 15.0 to 60.0 wt % of expanded graphite, the D(0.5) of the graphite, determined by sieve analysis according to DIN 51938, being <1.2 mm, C) 5.0 to 7.0 wt % of at least one phosphorus compound of the formula

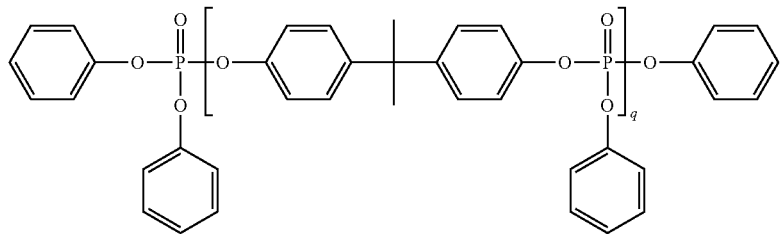

where q is between 1.0 and 1.2 and is preferably 1.1,
D) 3.0 to 4.0 wt % of at least one ethylene/alkyl (meth) acrylate copolymer,
E) optionally at least one further polymer additive, selected from the group of the heat stabilizers, flame retardants other than component C), antistatic agents, colorants, pigments, mould release agents, UV absorbers, IR absorbers and/or fillers, selected from the group of chalk, quartz powder, titanium dioxide, silicates, aluminosilicates, aluminium oxide, silica, magnesium hydroxide and/or aluminium hydroxide, with components A) to E) adding up to 100 wt %.

According to one particularly preferred embodiment, the composition of the invention comprises A) 52.0 to 72.0 wt %, preferably 52.0 to 71.0 wt % of polycarbonate,
B) 20.0 to 35.0 wt % of expanded graphite, the D(0.5) of the graphite, determined by sieve analysis according to DIN 51938, being <1.2 mm,
C) 5.0 to 10.0 wt %, preferably 5.0 to 7.0 wt % of at least one phosphorus compound of the formula

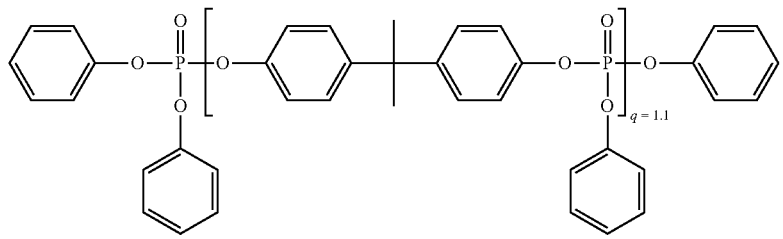

D) 2.0 to 4.0 wt %, preferably 3.0 to 4.0 wt % of at least one ethylene/alkyl (meth)acrylate copolymer,
E) optionally at least one further polymer additive, selected from the group of the heat stabilizers, flame retardants other than component (C), antistatic agents, colorants, pigments, mould release agents, UV absorbers, IR absorbers and/or fillers, selected from the group of chalk, quartz powder, titanium dioxide, silicates, aluminosilicates, aluminium oxide, silica, magnesium hydroxide and/or aluminium hydroxide,
with components A) to E) adding up to 100 wt %.

With particular preference in this embodiment the melt flow index of component D is at least 2.5 g/10 min, determined according to ASTM D1238 (at 190° C. and 2.16 kg).

Another particularly preferred composition of the Invention comprises

A) 52.0 to 60.0 wt % of polycarbonate,
B) 30.0 to 35.0 wt % of expanded graphite, the D(0.5) of the graphite, determined by sieve analysis according to DIN 51938, being <1.2 mm,
C) 5.0 to 10.0 wt %, preferably 5.0 to 7.0 wt % of at least one phosphorus compound of the formula

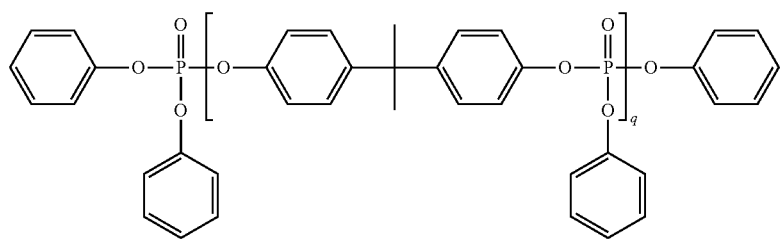

where q Is between 1.0 and 1.2 and is preferably 1.1,
D) 3.0 to 4.0 wt % of at least one ethylene/alkyl (meth) acrylate copolymer,
E) optionally at least one further polymer additive, selected from the group of the heat stabilizers, flame retardants other than component (C), antistatic agents, colorants, pigments, mould release agents, UV absorbers, IR absorbers and/or fillers, selected from the group of chalk, quartz powder, titanium dioxide, silicates, aluminosilicates, aluminium oxide, silica, magnesium hydroxide and/or aluminium hydroxide, with components A) to E) adding up to 100 wt % and where the composition is free from fluorine-containing anti-dripping agent.

The polymer compositions of the invention, comprising the components stated above, are produced by familiar Incorporation processes, by combining, mixing and homogenizing the individual constituents, with the homogenizing in particular taking place preferably in the melt with exposure to shearing forces. The combining and mixing optionally takes place prior to homogenization in the melt, using powder premixes.

It is also possible to use premixes of granules or of granules and powders with the additions according to the invention.

It is also possible to use premixes produced from solutions of the mixture components in suitable solvents, the materials being optionally homogenized in solution and the solvent then being removed.

In particular in this case it is possible to introduce the components and aforementioned additives of the compositions of the invention by means of known methods or as a masterbatch.

The use of masterbatches is especially preferred for introducing the additives, with masterbatches based on the respective polymer matrix being used more particularly.

In this connection, the composition may be combined, mixed, homogenized and subsequently extruded in customary apparatus such as screw-based extruders (for example twin-screw extruders, TSE), kneaders, Brabender mills or Banbury mills. Following extrusion, the extrudate may be cooled and comminuted. It is also possible to premix individual components and then to add the remaining starting materials individually and/or likewise in a mixture.

Production of the plastics moldings from the composition of the invention may be accomplished preferably by injection moulding, thermoforming, extrusion, lamination, film insert moulding, in-mould decoration, in-mould coating and rapid heatcycle moulding.

Also of interest is the use of the plastics compositions of the invention for producing multi-layer systems. In this case the plastics composition of the invention is applied in one or more layers to a shaped article made from a plastic. Application may take place at the same time as or immediately after the shaping of the moulding, by means, for example, of application of material to the back of a foil, by coextrusion or by multi-component injection moulding. Alternatively, application may also take place to the fully formed base body, by lamination with a film, injection of material around an existing moulding, or coating from a solution, for example.

EXAMPLES

Components Used

Component A-1
Linear polycarbonate based on bisphenol A, having an MVR of about 17.0 g/(10 min) (as per ISO 1133, at 250° C. under a load of 2.16 kg).
Component A-2
Linear polycarbonate based on bisphenol A, having an MVR of about 19.0 g/(10 min) (as per ISO 1133, at 300° C. under a load of 1.2 kg).
Component B-1
Expanded graphite Ecophit® GFG 500 from SGL Carbon GmbH, having a D(0.5) of 870 μm.
Component B-2
Expanded graphite Ecophit® GFG 900 from SGL Carbon GmbH having a D(0.5) of 860 μm.
Component B-3
Expanded graphite Ecophit® GFG 1200 from SGL Carbon GmbH having a D(0.5) of 1200 μm.
Component B-4
Expanded graphite SC 4000 O/SM from Graphit Kropfmühl GmbH having a D(0.5) of 1000 μm.
Component C
Bisphenol A-based oligophosphate with 8.9% phosphorus content, Reofos® BAPP (from Chemtura, Indianapolis, USA).

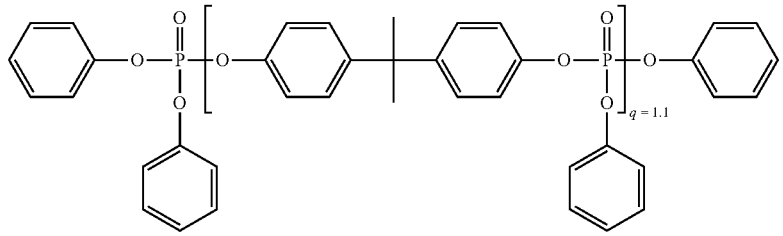

Component D
Elvaloy® 1820 AC (DuPont), ethylene/methyl acrylate copolymer having a methyl acrylate content of 20 wt % and a melt flow index of 8 g/(10 min), determined at 190° C. and 2.16 kg according to ASTM D1238.
Component E-1
Tris(2,4-di-tert-butylphenyl) phosphite (CAS number 31570-04-4), available commercially as Irgafos® 168 from BASF SE in Ludwigshafen.
Component E-2
Triphenylphosphine (TPP), acquired from Sigma-Aldrich, 82018 Taufkirchen, Germany.
Component E-3
Pentaerythritol tetrastearate, acquired as Loxiol VPG 861 from Emery Oleochemicals.

Components A to E were mixed on a Ko-Kneter MDK 46 kneader (from Buss) with an energy input of 0.07-0.17 kWh/kg, a throughput of 10-11 kg/h and a screw rotation frequency of 85-110 1/min. The moldings in Table 1 were produced on an Arburg SG 410 injection-moulding machine at 280° C. The moldings in Tables 3 and 5 were produced on an Arburg SG 220 injection-moulding machine at 280° C.

Test Methods Used:

The MVR was determined according to ISO 1133 at 330° C., using a ram load of 2.16 kg.

The modulus of elasticity was measured according to ISO 527-1, -2 on single-side-injected dumbbell specimens with a core measuring 80×10×4 mm at 23° C.

The thermal conductivity in injection moulding direction (in plane) at 23° C. was determined according to ASTM E 1461 on samples measuring 80 mm×80 mm×2 mm.

The Vicat softening temperature was determined according to ISO 306 (Method B).

The longitudinal shrinkage in injection moulding direction was determined according to ISO 294-4 on Injection-moulded test specimens measuring 60 mm×60 mm×2 mm at 500 bar.

Results:

TABLE 1

|  |  | Comparative example 1 | Comparative example 2 | Example 1 | Example 2 | Example 3 |
|---|---|---|---|---|---|---|
| A-1 | [wt %] | 58.6 | 57.6 | 53.6 | 51.6 | 48.6 |
| A-2 | [wt %] | 3.0 | 3.0 | 3.0 | 3.0 | 3.0 |
| B-1 | [wt %] | 35.0 | 35.0 | 35.0 | 35.0 | 35.0 |
| C | [wt %] | 0 | 0 | 5.0 | 7.0 | 10.0 |
| D | [wt %] | 3.0 | 4.0 | 3.0 | 3.0 | 3.0 |
| E-1 | [wt %] | 0.075 | 0.075 | 0.075 | 0.075 | 0.075 |
| E-2 | [wt %] | 0.025 | 0.025 | 0.025 | 0.025 | 0.025 |
| E-3 | [wt %] | 0.3 | 0.3 | 0.3 | 0.3 | 0.3 |

TABLE 2

|  |  | Comparative example 1 | Comparative example 2 | Example 1 | Example 2 | Example 3 |
|---|---|---|---|---|---|---|
| Longitudinal shrinkage | [%] | 0.16 | 10.17 | 0.12 | 0.10 | 0.08 |
| Softening temperature | [° C.] | 141.0 | 141.0 | 117.0 | 110.0 | 100.0 |

By contrasting comparative examples 1 and 2 with inventive examples 1 and 2 it is apparent that the longitudinal shrinkage is reduced significantly as a result of adding component C. According to example 3, however, there is a limit on the optimum amount of component C added, since if the amount of component C added is too high, the softening temperature of the thermoplastic compositions is too low for them to retain dimensional stability durably in diverse applications. Accordingly, only examples 1 and 2 offer a very balanced proportion of longitudinal contraction (≤0.14%) and softening temperature (≥110° C.).

TABLE 3

|  |  | Comparative example 3 | Example 4 | Example 5 | Example 6 | Comparative example 4 | Example 7 | Comparative example 5 |
|---|---|---|---|---|---|---|---|---|
| A-1 | [wt %] | 54.6 | 50.6 | 56.6 | 51.6 | 51.6 | 51.6 | 61.6 |
| A-2 | [wt %] | 3.0 | 3.0 | 3.0 | 3.0 | 3.0 | 3.0 | 3.0 |
| B-1 | [wt %] | 35.0 | 35.0 | 30.0 |  |  | 35.0 | 35.0 |
| B-2 | [wt %] |  |  |  | 35.0 |  |  |  |
| B-3 | [wt %] |  |  |  |  | 35.0 |  |  |
| C | [wt %] | 7.0 | 7.0 | 7.0 | 7.0 | 7.0 | 7.0 |  |
| D | [wt %] |  | 4.0 | 3.0 | 3.0 | 3.0 | 3.0 |  |
| E-1 | [wt %] | 0.075 | 0.075 | 0.075 | 0.075 | 0.075 | 0.075 | 0.075 |
| E-2 | [wt %] | 0.025 | 0.025 | 0.025 | 0.025 | 0.025 | 0.025 | 0.025 |
| E-3 | [wt %] | 0.3 | 0.3 | 0.3 | 0.3 | 0.3 | 0.3 | 0.3 |

TABLE 4

|  |  | Comp. 3 | Ex. 4 | Ex. 5 | Ex. 6 | Comp. 4 | Ex. 7 | Comp. 5 |
|---|---|---|---|---|---|---|---|---|
| Thermal conductivity (in plane) | [W/(m*K)] | 11.7 | 10.9 | 9.1 | 10.5 | 11.4 | 10.2 | 10.6 |
| MVR 330° C., 2.16 kg | [cm$^3$/10 min] | 6.85 | 14.7 | 17.2 | 10.65 | 5.1 | 10.9 | 1.75 |

TABLE 4-continued

|  |  | Comp. 3 | Ex. 4 | Ex. 5 | Ex. 6 | Comp. 4 | Ex. 7 | Comp. 5 |
|---|---|---|---|---|---|---|---|---|
| Mod. elast. | N/mm² | 7584 | 5836 | 5416 | 5957 | 5728 | 6267 | 6921 |

A comparison of examples 2 and 6 with comparative examples 4 and 5 clearly shows the decrease in flow capacity at elevated temperature depending on the graphite used and also on the associated average particle diameter D(0.5) of the respective particle size distribution. Hence graphites having an average particle diameter D(0.5)≥1 mm lead to poorer, and more particularly ≥1.2 mm to significantly less fluid thermoplastic compositions, but without producing any substantial additional improvement in the thermal conductivity.

A comparison of example 6 with comparative examples 3 and 5 shows that omitting component D and also omitting components C and D lead to less fluid thermoplastic compositions with too high a modulus of elasticity.

Lastly, examples 2 to 9 show the spectrum of compositions of the invention, with variation being possible both in the amount and in the particle size distribution of component B and also in the amount of component D, within limits according to the Invention.

TABLE 5

|  |  | Example 8 | Example 9 |
|---|---|---|---|
| A-1 | [wt %] | 68.6 | 68.6 |
| A-2 | [wt %] | 30 | 3.0 |
| B-1 | [wt %] | 20.0 |  |
| B-4 | [wt %] |  | 20.0 |
| C | [wt %] | 5.0 | 5.0 |
| D | [wt %] | 3.0 | 3.0 |
| E-1 | [wt %] | 0.075 | 0.075 |
| E-2 | [wt %] | 0.025 | 0.025 |
| E-3 | [wt %] | 0.3 | 0.3 |

TABLE 6

|  |  | Example 8 | Example 9 |
|---|---|---|---|
| Thermal conductivity (in plane) | [W/(m * K)] | 4.9 | 6.5 |
| MVR 330° C., 2.16 kg | [cm³/10 min] | 19.0 | 22.5 |
| Softening temperature | [° C.] | 122 | 125 |
| Modulus of elasticity (23° C.) | N/mm² | 4435 | 4971 |

FIG. 1 shows clearly the improvement in the processing properties of the thermally conductive compositions of the Invention on the basis of a completely filled structural component, based on the composition from example 2 (right-hand component), In comparison to the Incompletely filled structural component, based on the composition from comparative example 7 (left-hand component).

The invention claimed is:
1. A composition comprising
  A) 20.0 to 80.49 wt % of polycarbonate,
  B) 15.0 to 60.0 wt % of expanded graphite, the D(0.5) of the graphite, determined by sieve analysis according to DIN 51938, being <1.2 mm,
  C) 4.5 to 10 wt % of at least one phosphorus compound of the general formula (V)

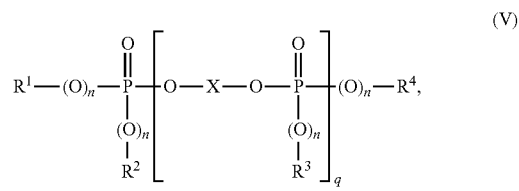

in which
  $R^1$, $R^2$, $R^3$ and $R^4$ independently of one another are $C_1$- to $C_8$-alkyl, optionally halogenated and in each case branched or unbranched, and/or $C_5$- to $C_6$-cycloalkyl, $C_6$- to $C_{20}$-aryl or $C_7$- to $C_{12}$-aralkyl, optionally substituted by a branched or unbranched alkyl and/or halogen,
  n independently at each occurrence is 0 or 1,
  q is an integer from 0 to 30,
  X is a monocyclic or polycyclic aromatic radical having 6 to 30 C atoms or is a linear or branched aliphatic radical having 2 to 30 C atoms, optionally substituted or unsubstituted, bridged or unbridged;
  D) 0.01 to 5.0 wt % of at least one ethylene/alkyl (meth)acrylate copolymer,
  E) optionally at least one further polymer additive, selected from the group consisting of heat stabilizers, flame retardants other than component C, antistatic agents, colorants, pigments, mould release agents, UV absorbers, IR absorbers and fillers, selected from the group of chalk, quartz powder, titanium dioxide, silicates, aluminosilicates, aluminium oxide, silica, magnesium hydroxide and aluminium hydroxide,
  with components A) to E) adding up to 100 wt %.
2. The composition according to claim 1, wherein expanded graphite comprises at least one expanded graphite having a particle size distribution defined by the D(0.5) of ≤1 mm, determined by sieve analysis according to DIN 51938, and also a bulk density of ≥0.1 g/cm³, determined according to DIN 51705.
3. The composition according to claim 1, wherein the composition is free from fluorine-containing anti-dripping agent.
4. The composition according to claim 1, wherein in the phosphorus compound of the general formula V,
  X is one of the following structures:

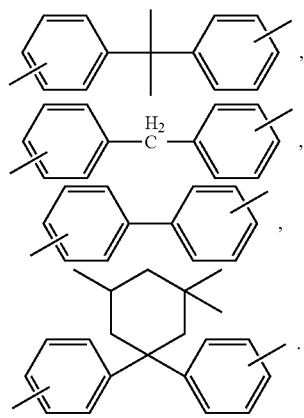

5. The composition according to claim 1, wherein phosphorus compound of the general formula V comprises the compound of the formula Va

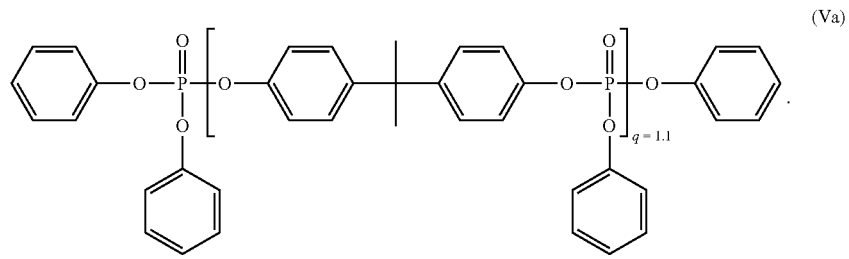

6. The composition according to claim 1, wherein the ethylene/alkyl (meth)acrylate copolymer has a melt flow index of at least 2.5 g/10 min, determined according to ASTM D1238 (at 190° C. and 2.16 kg).

7. The composition according to claim 1, wherein the fraction of component A is 20.0 to 72.0 wt %.

8. The composition according to claim 1, wherein the fraction of component C is 6.0 to 9.0 wt %.

9. The composition according to claim 1, wherein the fraction of component C is 5.0 to 7.0 wt %.

10. The composition according to claim 1, wherein the amount of ethylene/alkyl (meth)acrylate copolymer is 3.0 to 4.0 wt %.

11. The composition according to claim 1, wherein the composition comprises
A) 52.0 to 72.0 wt % of polycarbonate,
B) 20.0 to 35.0 wt % of expanded graphite, the D(0.5) of the graphite, determined by sieve analysis according to DIN 51938, being <1.2 mm,
C) 5.0 to 10.0 wt % of at least one phosphorus compound of the formula

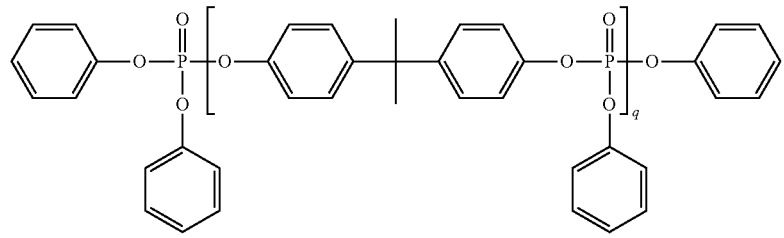

where q is between 1.0 and 1.2 and is preferably 1.1,
D) 3.0 to 4.0 wt % of at least one ethylene/alkyl (meth) acrylate copolymer,
E) optionally at least one further polymer additive, selected from the group of consisting of heat stabilizers, flame retardants other than component (C), antistatic agents, colorants, pigments, mould release agents, UV absorbers, IR absorbers and fillers, selected from the group consisting of chalk, quartz powder, titanium dioxide, silicates, aluminosilicates, aluminium oxide, silica, magnesium hydroxide and aluminium hydroxide,
with components A) to E) adding up to 100 wt % and where the composition is free from fluorine-containing anti-dripping agent.

12. The composition according to claim 11, wherein the fraction of component C in the composition is 5.0 to 7.0 wt %.

13. A plastics moulding comprising the composition according to claim 1.

* * * * *